United States Patent [19]

Shirai

[11] Patent Number: 4,460,248

[45] Date of Patent: Jul. 17, 1984

[54] TWO-LAYER GUEST-HOST LIQUID CRYSTAL DISPLAY DEVICE

[75] Inventor: Yoshihiro Shirai, Yamatokoriyama, Japan

[73] Assignee: Sharp Kabushiki Kaisha, Osaka, Japan

[21] Appl. No.: 324,684

[22] Filed: Nov. 25, 1981

[30] Foreign Application Priority Data

Nov. 28, 1980 [JP] Japan .................. 55-169318

[51] Int. Cl.³ .............................. G02F 1/13
[52] U.S. Cl. .................... 350/335; 350/349
[58] Field of Search ................... 350/349, 335

[56] References Cited

U.S. PATENT DOCUMENTS

| | | | |
|---|---|---|---|
| 3,703,329 | 11/1972 | Castellano | 350/349 |
| 3,833,287 | 9/1974 | Taylor et al. | 350/349 |
| 3,960,751 | 6/1976 | Moriyama et al. | 350/349 X |
| 3,967,881 | 7/1976 | Moriyama et al. | 350/349 X |
| 4,241,339 | 12/1980 | Ushiyama | 350/349 X |
| 4,324,455 | 4/1982 | Imahori et al. | 350/349 |

*Primary Examiner*—John K. Corbin
*Assistant Examiner*—Richard F. Gallivan
*Attorney, Agent, or Firm*—Birch, Stewart, Kolasch & Birch

[57] ABSTRACT

A two-layer guest-host liquid crystal display device is provided, each layer having a guest-host liquid crystal layer sandwiched between a pair of substrates and being provided with an electrode for applying an electric field to said liquid crystal layer, which comprises a first display layer comprising a P-type pleochroic dye material and a first liquid crystal material and a second display layer comprising an N-type pleochroic dye material and a second liquid crystal material.

3 Claims, 5 Drawing Figures

TWO-LAYER GUEST-HOST LIQUID CRYSTAL DISPLAY DEVICE

BACKGROUND OF THE INVENTION

The present invention relates to a guest-host liquid crystal display and, more particularly, to a two-layer guest-host liquid crystal display device.

Guest-host liquid crystal display devices have a guest-host liquid crystal layer sandwiched between a pair of substrates each provided with an electrode for applying an electric field to the liquid crystal layer. The guest-host liquid crystal layer comprises a guest pleochroic dye and a liquid crystal host.

A multistory guest-host liquid crystal display device has been proposed where at least two of the guest-host liquid crystal display layers are provided to provide mixed coloration. An example of these two-layer guest-host liquid crystal displays is shown in FIG. 1.

The conventional display of FIG. 1 comprised a polarizer 1 where the polarization direction is represented by A, glass substrates 2, liquid crystal molecules 3, pleochroic dye materials 4 and 4', and two driving sources 5. The liquid crystal of the molecules 3 are positive dielectric anisotropy nematic liquid crystal. The pleochroic dye materials 4 and 4' are P-type dye materials in which each showed a different color.

When both of the driving sources 5 supplied no voltage to the display, each of the liquid crystal molecules 3 and the dye materials 4 and 4' was oriented to be parallel with the substrates 2. When white light polarized by the polarizer 1 was incident on the display cell, each of the dye materials 4 and 4' absorbed peculiar spectra. As a result, since the display layers overlapped, their display colors were mixed at no-voltage applied portions as the background, thus the mixed display colors were not suitable for displays.

When only one of the two display layers was driven by the driving source 5, the dye materials and the liquid crystal materials at positions of any voltage applied were oriented to be perpendicular to the substrate 2. Little light was absorbed. Then, the display color was the color of the dye materials contained within the display layer free of driving voltage.

When both of the two display layers were driven, the incident white light was not absorbed and transmitted so that the display was colorless.

SUMMARY OF THE INVENTION

Accordingly, it is an object of the present invention to provide an improved two-layer guest-host liquid crystal device for showing a pleochroic and clear display.

Briefly described, in accordance with the present invention, a two-layer guest-host liquid crystal display device, each having a guest-host liquid crystal layer sandwiched between a pair of substrates and each provided with an electrode for applying an electric field to the liquid crystal layer, comprises a first display layer comprising a P-type pleochroic dye material and a first liquid crystal material, and a second display layer comprising an N-type pleochroic dye material and a second liquid crystal material.

BRIEF DESCRIPTION OF THE DRAWINGS

The present invention will become more fully understood from the detailed description given hereinbelow and accompanying drawings which are given by way of illustration only, and thus are not limitative of the present invention and wherein.

DESCRIPTION OF THE INVENTION

Figure 1:
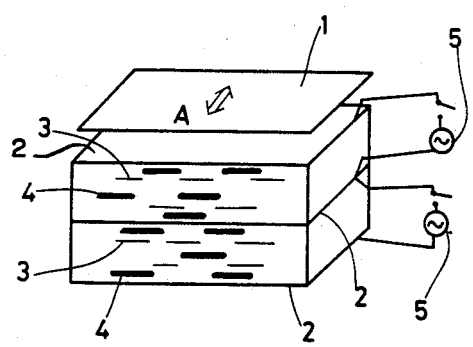
FIG. 1 shows a schematic representation of a conventional two-layer guest-host liquid crystal display device.
Figure 2:
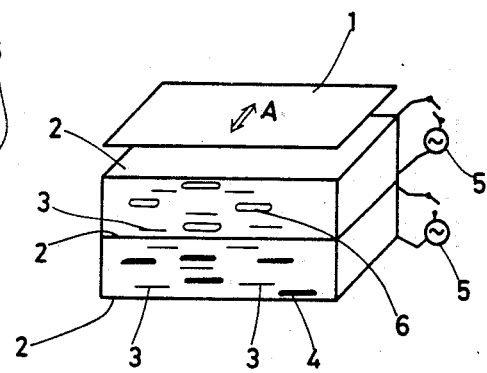
FIGS. 2 and 4 show a schematic representation of a two-layer guest-host liquid crystal display device according to the present invention.
Figure 3:
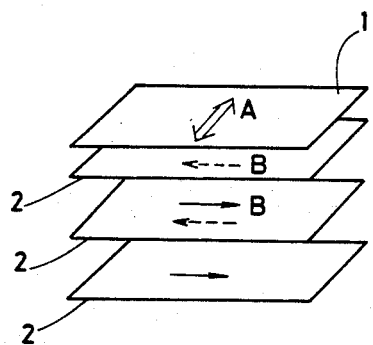
FIGS. 3 and 5 show schematic liquid crystal molecule orientation of the display device of FIGS. 2 and 4, respectively.

FIG. 2 shows a schematic representation of a two-layer guest-host liquid crystal display device according to the present invention. FIG. 3 shows schematic liquid crystal molecule orientation B of the device of FIG. 2 by the rubbing method or the like.

The device of FIG. 2 comprises a polarizer 1 where the polarization direction is indicated by A, glass substrates 2, liquid crystal molecules 3, pleochroic dye materials 4 and 6, and two driving sources 5. The liquid crystal of the molecules 3 is positive dielectric anisotropy nematic liquid crystal. The liquid crystal molecules 3 are oriented to be homogeneous when no voltage is applied.

According to the present invention, the type of pleochroic dye materials to be contained within each of the display layers reverses. When one of the two display layers contains P-type pleochroic dye materials, the other of the display layers contains N-type pleochroic dye materials.

P-type pleochroic dye materials are such that, when the dye materials are oriented to be parallel with the substrates 2, they absorb peculiar light spectra, and when they are oriented to be perpendicular to the substrates 2, they do not absorb any light spectra.

N-type pleochroic dye materials are such that, when the dye materials are oriented to be parallel with the substrates 2, they do not absorb any light spectra, and when they are oriented to be perpendicular to the substrates 2, they absorb peculiar light spectra.

As an example, the pleochroic dye materials 4 are of P-type, such as anthraquinone showing blue and the pleochroic dye materials 6 are of N-type, such as tetrazine showing red. The types of pleochroic dye materials can be exchanged. When the P-type pleochroic dye materials 4 can absorb peculiar light spectra, the N-type pleochroic dye materials 6 can not absorb any light spectra.

The liquid crystal of the molecules 3 may be positive dielectric anisotropy nematic liquid crystal composed of biphenyl such as commercial name GR-63 produced by Chisso Corporation, Japan. The N-type dye materials 6 are dissolved in a concentration of about 20 weight % while the P-type dye materials 4 are dissolved in a concentration of about 2 weight %. When sinusoidal AC voltage of about 5 V, 32 Hz is applied to the first display layer containing the N-type dye materials 6 and the second display layer containing the P-type dye materials 4, the resultant display color is as follows:

| the first display layer | the second display layer | the resultant display color |
| --- | --- | --- |
| Off | Off | blue |
| Off | ON | colorless |
| ON | Off | red |

| the first display layer | the second display layer | the resultant display color |
|---|---|---|
| ON | ON | red |

Figure 4:
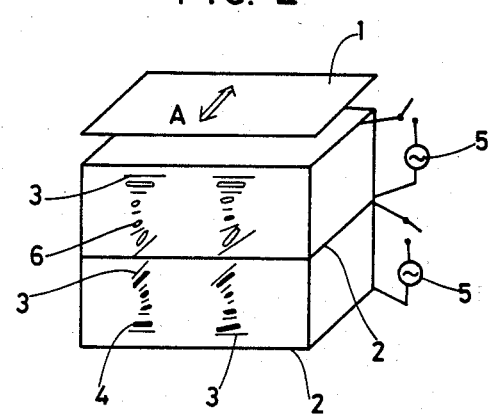
Figure 5:
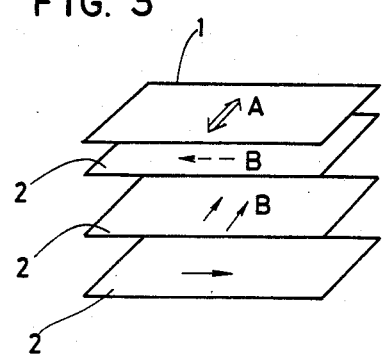

FIG. 4 shows a schematic representation of another two-layer guest-host liquid crystal display device according to the present invention. FIG. 5 shows schematic liquid crystal molecule orientation B of the device of FIG. 4 by the rubbing method or the like. Like elements corresponding to those of FIG. 2 are indicated by like numerals.

When no voltage is applied to the display device, the liquid crystal molecules are oriented to be parallel with the substrates 2 and are twisted between the substrates 2. The same materials as those in the device of FIG. 2 are used except that the liquid crystal is a spiral nematic liquid crystal comprising a biphenyl nematic liquid crystal, such as GR-63, as a principal constituent and a cholesteric liquid crystal, cholesteryl nonanoate as an additive of a slight amount. The device of FIG. 4 shows good display characteristics similar to that of FIG. 2 when the FIG. 4 device is driven under the same condition as the FIG. 2 device.

Some types of liquid crystal which can be adopted for the present invention are as follows:

| | | mesophase mode |
|---|---|---|
| 1. | a nematic liquid crystal | homogeneous |
| 2. | a nematic liquid crystal and a cholesteric liquid crystal of a slight amount | twisted nematic |
| 3. | a nematic liquid crystal and a cholesteric liquid crystal of | cholesteric-nematic phase transition |
| 4. | a small amount a cholesteric liquid crystal | cholesteric-nematic phase transition |

The invention being thus described, it will be obvious that the same may be varied in many ways. Such variations are not to be regarded as a departure from the spirit and scope of the invention, and all such modifications are intended to be included within the scope of the following claims.

What is claimed is:

1. A two-layer guest-host liquid crystal display device, each guest-host liquid crystal layer being sandwiched between a pair of substrates provided with electrodes for applying an electric field to said respective liquid crystal layers, comprising:
    a first display layer comprising a P-type pleochroic dye material and a first liquid crystal material; and
    a second display layer comprising an N-type pleochroic dye material and a second liquid crystal material such that upon controlled orientation of said dye materials with respect to the substrates a single color or dual color display can be provided on a background of a single solid color.

2. The device of claim 1, wherein either of the first liquid crystal material and the second liquid crystal material is selected from the group consisting of a nematic liquid crystal, a nematic liquid crystal and a cholesteric liquid crystal of a slight amount, a nematic liquid crystal and a cholesteric liquid crystal of a small amount, and a cholesteric liquid crystal.

3. The device of claim 1, wherein either of the first liquid crystal material and the second liquid crystal material is selected from the group consisting of a nematic liquid crystal, a nematic liquid crystal and a cholesteric liquid crystal and a cholesteric liquid crystal.

* * * * *